(12) United States Patent
Law et al.

(10) Patent No.: US 10,397,968 B2
(45) Date of Patent: *Aug. 27, 2019

(54) SYSTEMS AND METHODS FOR AUTOMATIC WIRELESS COUPLING

(71) Applicant: HIRSCHMANN AUTOMATION AND CONTROL GMBH, Neckartenzlingen (DE)

(72) Inventors: Lap Kong Law, Dublin, CA (US); Bernhard Wiegel, Stuttgart (DE); Constantin Baciu, Bucharest (RO)

(73) Assignee: HIRSCHMANN AUTOMATION AND CONTROL GMBH, Neckartenzlingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,806

(22) Filed: Jun. 30, 2017

(65) Prior Publication Data
US 2017/0303323 A1    Oct. 19, 2017

Related U.S. Application Data

(63) Continuation of application No. 14/867,956, filed on Sep. 28, 2015, now Pat. No. 9,699,815.

(51) Int. Cl.
*H04W 48/10* (2009.01)
*H04W 76/11* (2018.01)
(Continued)

(52) U.S. Cl.
CPC ............ *H04W 76/11* (2018.02); *H04W 8/005* (2013.01); *H04W 40/08* (2013.01); *H04W 40/14* (2013.01);
(Continued)

(58) Field of Classification Search
CPC ................. H04B 7/212; H04W 4/06
See application file for complete search history.

(56) References Cited

U.S. PATENT DOCUMENTS

8,644,234 B2   2/2014  Lee et al.
2002/0118664 A1*  8/2002  Ishibashi ............... H04W 48/20
                                                      370/338
(Continued)

OTHER PUBLICATIONS

Notice of Allowance on U.S. Appl. No. 14/867,956 dated Mar. 6, 2017.

*Primary Examiner* — Brandon M Renner
(74) *Attorney, Agent, or Firm* — Foley & Lardner LLP; Daniel Rose

(57) ABSTRACT

Wireless access points may automatically discover each other and establish connections based on accumulated credit values incremented via mutual exchanges of identifiers. A first access point may select a candidate access point for a potential connection, and may maintain a credit value for the selected candidate access point. The first access point may broadcast beacon messages, including an identification of the candidate access point and the credit value. Responsive to detecting a broadcast from the candidate access point including an identifier of the first access point, the first access point may increment the credit value. As each access point continues broadcasting beacon messages, it may increment its credit value for the other access point accordingly. Upon both the first access point's and candidate access point's credit values reaching a predetermined credit threshold, the access points may initiate handshaking protocols, without requiring additional request/response exchanges or verifications of candidate selection.

18 Claims, 9 Drawing Sheets

(51) Int. Cl.
  *H04W 8/00*    (2009.01)
  *H04W 84/18*   (2009.01)
  *H04W 40/08*   (2009.01)
  *H04W 40/14*   (2009.01)
  *H04W 40/24*   (2009.01)
  *H04W 76/10*   (2018.01)
  *H04W 92/20*   (2009.01)
  *H04W 40/02*   (2009.01)
  *H04W 84/12*   (2009.01)

(52) U.S. Cl.
  CPC ......... *H04W 40/244* (2013.01); *H04W 84/18* (2013.01); *H04W 40/02* (2013.01); *H04W 76/10* (2018.02); *H04W 84/12* (2013.01); *H04W 92/20* (2013.01)

(56) References Cited

U.S. PATENT DOCUMENTS

| | | | | |
|---|---|---|---|---|
| 2006/0003775 A1* | 1/2006 | Bull | ............ | G01S 5/0205 455/456.1 |
| 2009/0216906 A1* | 8/2009 | Weniger | ............ | H04L 41/147 709/246 |
| 2011/0075641 A1* | 3/2011 | Siriwongpairat | ... | B61L 27/0005 370/337 |
| 2011/0294504 A1* | 12/2011 | Hara | ............ | H04W 48/16 455/434 |
| 2013/0029630 A1* | 1/2013 | Salkini | ............ | H04L 63/10 455/404.1 |
| 2014/0313960 A1* | 10/2014 | Skinner | ............ | H04W 48/16 370/311 |
| 2014/0364128 A1* | 12/2014 | Lee | ............ | H04W 36/18 455/442 |
| 2015/0109897 A1* | 4/2015 | Lee | ............ | H04W 48/10 370/216 |
| 2015/0138967 A1* | 5/2015 | Kawashima | ............ | H04L 1/189 370/230 |
| 2015/0327159 A1* | 11/2015 | Gude | ............ | H04W 48/18 455/434 |
| 2016/0007076 A1* | 1/2016 | Takaki | ............ | H04N 21/41422 725/134 |
| 2016/0057038 A1* | 2/2016 | Watanabe | ............ | H04L 43/0847 370/244 |
| 2016/0119762 A1* | 4/2016 | Zhu | ............ | H04W 72/042 370/312 |
| 2016/0337961 A1* | 11/2016 | Hu | ............ | H04W 48/20 |
| 2016/0353253 A1* | 12/2016 | Cherian | ............ | H04W 4/06 |
| 2017/0303323 A1* | 10/2017 | Law | ............ | H04W 76/021 |

* cited by examiner

SYSTEMS AND METHODS FOR AUTOMATIC WIRELESS COUPLING

RELATED APPLICATIONS

This application claims the benefit of and priority as a continuation to U.S. patent application Ser. No. 14/867,956, entitled "Systems and Methods for Automatic Wireless Coupling," filed Sep. 28, 2015, the entirety of which is hereby incorporated by reference.

FIELD OF THE DISCLOSURE

This disclosure generally relates to systems and methods for wireless coupling of access points. In particular, this disclosure relates to channel selection, access point discovery, and connection establishment.

BACKGROUND OF THE DISCLOSURE

Wireless local area network (WLAN) devices may connect to each other to create peer-to-peer (P2P) or mesh networks, particularly in industrial applications where the network may extend over a large physical area. For example, FIG. 1A illustrates an implementation of a wireless network of a plurality of wireless access points 102A-102F installed on train coaches 100A-100C. Within a train coach (e.g. coach 100A), two access points (e.g. access points 102A and 102B) may be physically connected, such as via an Ethernet connection. Access points may also be connected between train coaches (e.g. access point 102B in coach 100A and access point 102C in coach 100B). However, as train coaches may be frequently coupled and uncoupled, physical connections may require extra time to connect and disconnect, and may be sources of physical component failure. Instead, access points between coaches may be connected via wireless connections 104A-104B as shown.

In some implementations, connections 104A-104B may be preconfigured. For example, access point 102B may be configured to establish connection 104A with access point 102C. However, if the train coaches are coupled in a different order, as shown in the implementation of FIG. 1B, access point 102B may need to be reconfigured to establish connection 104D with access point 102E. Such reconfiguration may take additional time, or require specialized tools or trained operators.

Similarly, in other implementations in which access points are deployed to create a mesh or P2P network, the access points may be pre-configured to establish connections with specified neighboring devices within the network. Manually reconfiguring the network topology may be complex and time-consuming.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
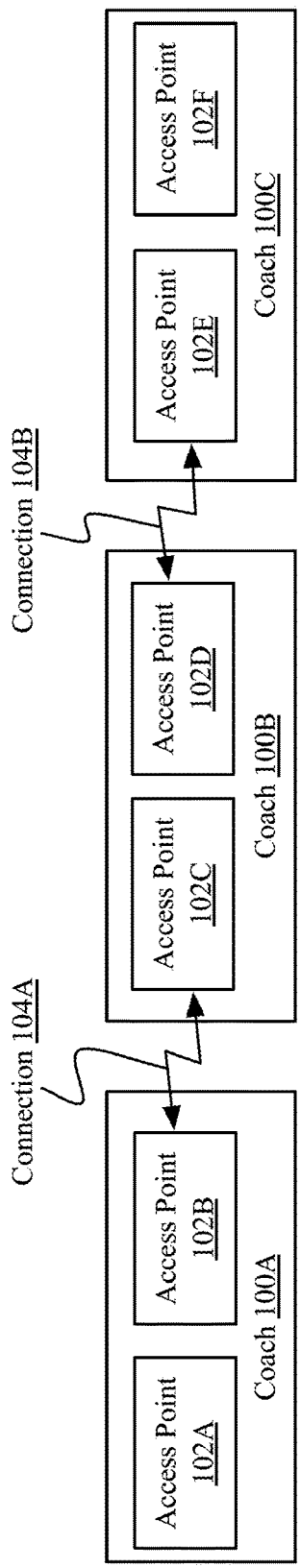
FIG. 1A is an illustration of coupling of wireless access points, in a first implementation.
Figure 1B:
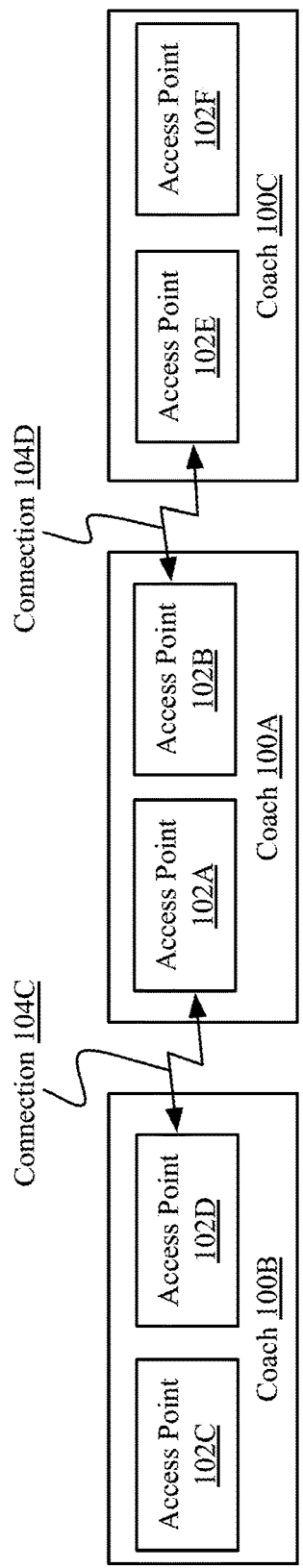
FIG. 1B is an illustration of coupling of wireless access points, in a second implementation.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for wirelessly coupling access points; and Section B describes a network environment and computing environment which may be useful for practicing embodiments described herein.

A. Wireless Coupling Mechanism

In one implementation, access points may be configured to automatically detect other access points, select an appropriate access point with which to establish a connection, and establish the connection. If the network physical topology is altered, the access points may detect a loss of the connection (e.g. via a loss of signal or connection timeout). The access points may then automatically detect and select a new access point to establish a connection with.

In a conventional implementation, an access point may detect and select another access point based on a received signal strength of the other access point being above a threshold amplitude for at least a predetermined time period. The access point may then transmit a request message to the selected access point, which may make a similar determination based on the received signal strength of the first access point being above the threshold amplitude for at least the predetermined time period. The selected access point may respond to the request with a confirmation message, if the determination indicates that the first access point has a signal strength greater than the threshold for at least the time period, or a rejection message, if the determination indicates that the first access point does not have a signal strength greater than the threshold or if the selected access point has identified a different access point to establish a connection with.

However, such conventional implementations may be unable to properly select an access point where multiple access points have signal strengths above the threshold. Furthermore, depending on the length of the time period, such conventional implementations may be prone to false positives due to signals that are above the threshold for a relatively short period, such as when an access point on one train coach passes an access point on another train coach on a different track. Additionally, these conventional implementations require additional negotiation before handshaking may be initiated: as noted above, the first access point may need to send a request message before the selected access point may make a determination of whether to connect to the first access point. This may result in wasted bandwidth and extended delays before a connection may be established.

In one implementation of the systems and methods discussed herein, rather than relying on simple amplitude and time thresholds and requiring additional request and response messages, a credit or counter may be accumulated and communicated to the network for a candidate access point, with connection establishment based on the credit value. In one such implementation, a first access point may select a candidate access point for a potential connection, and may maintain a credit value for the selected candidate access point. The first access point may broadcast service set identification (SSID) beacon messages, and may include an identification of the candidate access point and the credit value. Responsive to detecting a broadcast from the candidate access point including an identifier of the first access point, the first access point may increment the credit value. As each access point continues broadcasting beacon messages, it may increment its credit value for the other access point accordingly. Upon both the first access point's credit value and the candidate access point's credit values reaching a predetermined credit threshold, the access points may immediately initiate handshaking protocols, without requiring additional request/response exchanges or verifications of candidate selection.

Figure 2:
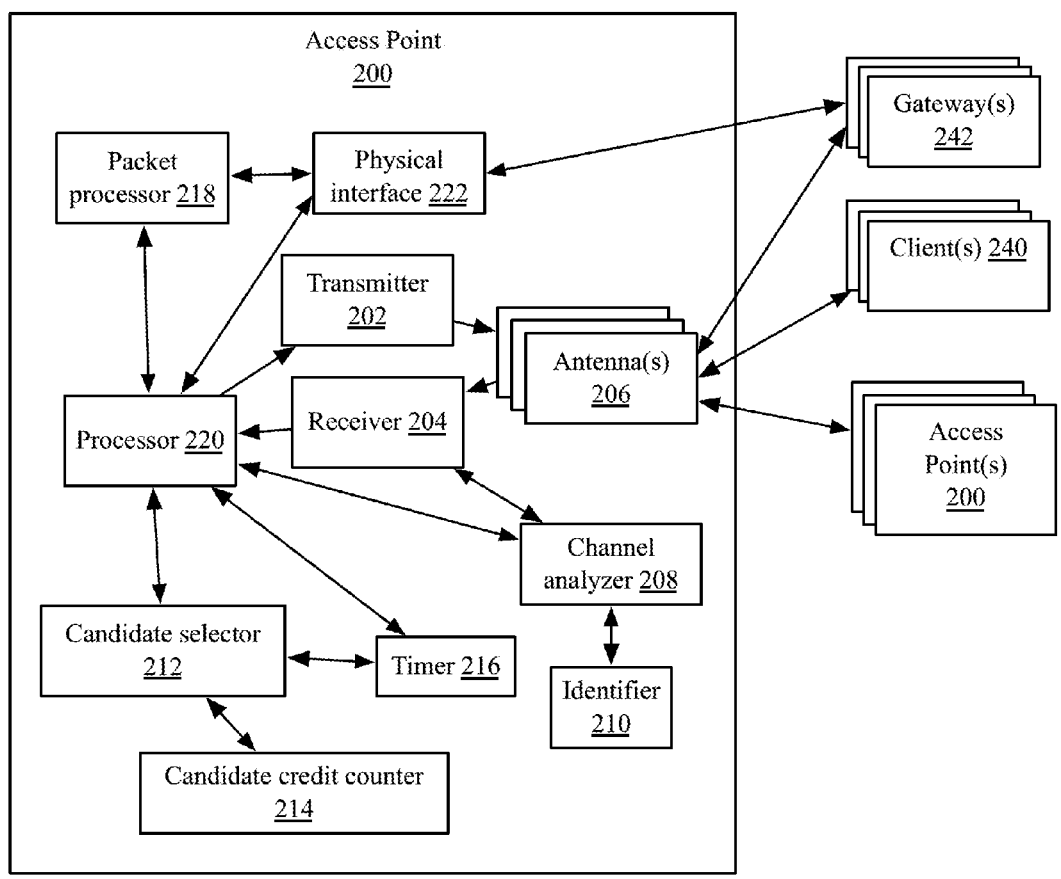
FIG. 2 is a block diagram of an implementation of an access point for wireless coupling to other access points, according to one implementation.

FIG. 2 is a block diagram of an implementation of an access point 200 for wireless coupling to other access points 200, according to one implementation. An access point 200 may be referred to as a wireless access point, a WLAN device or WLAN access point, a wireless gateway, a WiFi access point, or by any other such term. In some implementations, the access point 200 may provide wireless communications to one or more clients 240, such as laptop computers, desktop computers, portable computers, wearable computers, tablet computers, smart phones, embedded computers or smart devices, or any other such client devices. The access point 200 may use any type and form of wireless communications protocols, including without limitation any of the 802.11 family of wireless protocols, cellular protocols, Bluetooth protocols, near field communication (NFC) protocols, wireless universal serial bus (wireless USB) protocols, or any other type and form of wireless communications. As described above, the access point 200 may automatically detect, select, and establish a P2P or mesh network connection with another access point.

The access point may include one or more transmitters 202, receivers 204, and antennas 206. In some implementations, the access point may include different transmitters, receivers, and/or antennas for redundancy, utilization of different frequencies, and/or spatial diversity to improve the quality and reliability of a wireless link. The transmitters and receivers may be separate, as shown, or may be combined into a single transmitter/receiver. In some implementations, the transmitters and receivers may be software-defined radios (SDRs) executed by a processor 220 and/or embedded processors or components. Transmitters 202, receivers 204, and/or antennas 206 may include additional components, including amplifiers, filters, analog/digital and digital/analog converters, error correction processors, modems, encryption processors, sample rate converters, intermediate frequency oscillators, mixers, or other such elements.

An access point 202 may include a channel analyzer 208. Channel analyzer 208 may comprise software executed by a processor 220, or may include one or more hardware components, embedded controllers, field programmable gate arrays (FPGAs), or other such elements preconfigured for performing the functions of the channel analyzer. During a channel selection phase of operation of the access point, a channel analyzer 208 may monitor characteristics of a plurality of channels. Channel analyzer 208 may control one or more receivers 204 to tune to a plurality of channels or frequencies, and may analyze average signal or noise levels on each channel, peak signal or noise levels, and beacon broadcasts on each channel from other access points or other devices. Beacon broadcasts from access points 200 may include an identifier 210 for advanced control of network topology, sometimes referred to as a topology configuration identifier 210, which may be a default or predetermined identifier or value, or may be specified by an administrator or operator. Identifier 210 may be stored in memory of the access point or may be configured through one or more switches (e.g. DIP switches) or similar physical settings. During channel scanning, channel analyzer 208 may receive beacon broadcasts from other access points on one or more channels and determine if any received beacon broadcast includes the identifier 210 specified for the access point. If so, channel analyzer 208 may select a corresponding channel of the broadcast for use in establishing network connections. If multiple beacon broadcasts including the specified identifier 210 are received on different channels, channel analyzer 208 may select the channel corresponding to the beacon broadcast having the highest signal strength. For example, if identifier 210 is set to value "A" and beacons are detected on channel 1 with identifier "A" at a received signal strength of −70 dBm; channel 2 with identifier "B" at a received signal strength of −60 dBm; and channel 3 with identifier "A" at a received signal strength of −65 dBm, the channel analyzer 208 may select channel 3 for use in establishing a network connection. This allows administrators to separate different mesh networks via configuration of identifiers.

If no beacon broadcasts are detected including the specified value of identifier 210, then the channel analyzer 208 may select a least used channel (e.g. a channel having a lowest average noise level, a channel having the longest pauses between detected signals, etc.) for use in establishing a network connection. The channel analyzer 208 may control receiver 204 to tune to the selected channel.

Once a channel is selected for establishing a network connection, a candidate selector 212 may monitor beacon broadcasts on the channel. In some implementations, each beacon broadcast may include an identifier of the broadcasting access point (e.g. an SSID, MAC address, or other such identifier), as well as the default or configured identifier 210. Beacon broadcasts may also include an identifier of another, candidate access point selected by the broadcasting access point and a credit or counter value for the candidate access point maintained by the broadcasting access point. Candidate selector 212 may comprise an application, service, server, daemon, routine, or other executable logic executed by a processor 220, or may comprise hardware components such as an FPGA or EEPROM programmed to select a candidate access point. Candidate selector 212 may identify a beacon broadcast of the one or more monitored beacon broadcasts with a highest received signal strength as a candidate access point, and may maintain a candidate credit counter 214 for the candidate access point. The credit counter 214 may be reset upon selection of a new candidate. In some implementations, candidate selector 212 may filter or ignore high transient received signal strength indicators or unstable signal strength indicators, such as from another access point in motion that approaches the access point (resulting in increasing signal strength) and then passes the access point (resulting in decreasing signal strength). In some implementations, to not be filtered or ignored, a potential candidate access point may need to have a received signal strength above a threshold for a time period, or may need to have a received signal strength that does not vary more than a predetermined amount during a time period. If no candidate access point is detected before expiration of a timer 216, then the channel analyzer 208 may return to scanning.

Once the candidate selector 212 has selected a candidate access point based on the candidate's beacon broadcasts having a highest received signal strength of any received beacon broadcast from other access points, the access point may transmit, via transmitter 202, a beacon broadcast including an identifier of the access point; an identifier of the selected candidate access point; and a value of the candidate credit counter 214. In some implementations, the beacon broadcast may also include the topology configuration identifier 210, as discussed above. Beacons may be broadcast periodically, in accordance with the relevant network protocol standards.

The candidate selector 212 may also receive, via receiver 204, a beacon broadcast from the selected candidate access point. The received beacon broadcast may include an identifier of the selected candidate access point; an identifier of an access point selected as a candidate by the selected candidate access point (e.g. the candidate access point's own selected candidate); and a value of the candidate credit counter maintained by the selected candidate access point. If the received beacon includes, as the candidate access point's own selected candidate identifier, the identifier of the access point, the candidate selector 212 may increment the value of candidate credit counter 214. If the received beacon does not include the identifier of the access point as the candidate identifier, then the candidate selector 212 may reset the value of the candidate credit counter 214. In some implementations, the candidate selector 212 may return to monitoring and selection of a candidate access point.

Accordingly, for two access points that have selected each other as candidates, the beacon broadcast by the first access point will include an identifier of the second access point and a corresponding credit counter value; and the beacon broadcast by the second access point will include an identifier of the first access point and a corresponding credit counter value. With each exchange of beacons, provided each access point remains the access point with the highest received signal strength, the credit counter values will be incremented. Upon each access point determining that its own credit counter has reached a predetermined threshold (e.g. 20, 30, 50, or any other such value) and determining that the credit counter received in beacons from the other access point has also reached the predetermined threshold, the access points may initiate a handshaking and connection establishment protocol.

In one implementation, handshaking may comprise an exchange of keys, sequence identifiers, or any other such data required by the wireless protocol. Handshaking packets may be generated by a packet processor 218, which may comprise any type of application, server, service, daemon, routine, network stack, network interface, or other hardware or software for generating and processing packets. In one implementation, a handshaking protocol may require designation of a master or host device and slave or client device, such that one device transmits a connection request and the other device transmits an acknowledgement or connection response including selected sequence numbers, keys, or other data. In one such implementation, a packet processor 218 may determine whether it is a master or slave device by comparing an identifier of the access point (such as a MAC address) to a received identifier of the selected candidate access point (such as the candidate's MAC address). In one implementation, if the access point's address is larger or higher than the candidate access point's address, then the access point may determine it is the slave or client and may transmit a connection request or initiate handshaking. If the access point's address is smaller or lower than the candidate access point's address, then the access point may determine it is the master or host, and may wait for a connection request from the other device. In other implementations, other addresses or comparisons may be used, or the above-discussed comparison may be inverted such that the larger address is the host device. If no connection request is received by the master device or no connection response is received by the client device before expiration of a connection establishment timer 216, then the access point may return to candidate selection or channel scanning.

In some implementations, an access point may also include one or more physical network interfaces 222. Physical network interfaces 222 may comprise any type and form of network interface, such as an Ethernet interface, a USB interface, a serial interface, or any other type and form of physical network interface. The physical network interfaces 222 may be used to connect to gateway devices 242 or modems for connection of the P2P or mesh network to other networks, such as the Internet or another wide area network (WAN). For example, a set of access points 200 may establish a P2P network and may connect, via one access point, to a cellular modem for connection to the Internet. In other implementations, physical interfaces 222 may be used to connect access points 200 with physical links where the access points 200 do not move in relation to each other. For example, referring briefly back to FIG. 1A, in implementations in which access points are installed within train coaches, access points within a single coach (e.g. access points 102A-102B within coach 100A; access points 102C-102D within coach 100B, etc.) may be connected via physical interfaces 222 of each access point, but may connect to access points in neighboring coaches via automatically discovered and established wireless network connections, as discussed above.

Figure 3:
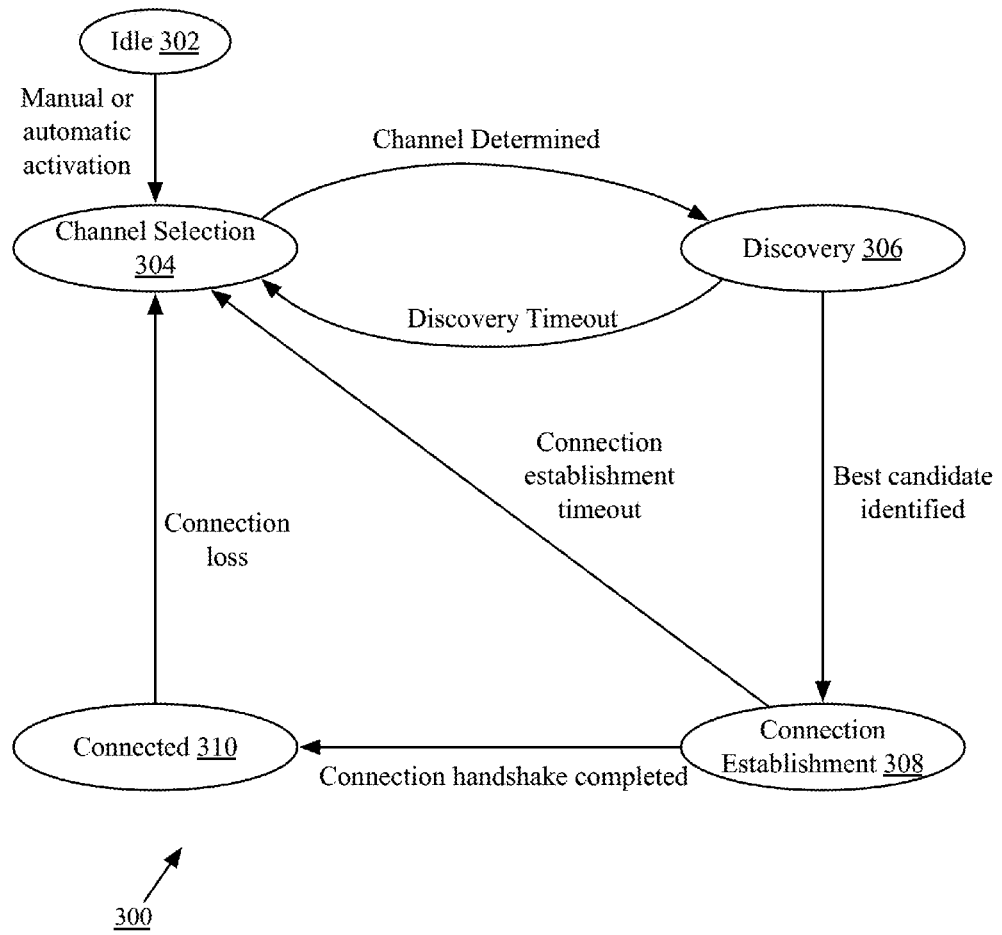
FIG. 3 is a state diagram of an implementation of a wireless coupling system.

FIG. 3 is a state diagram of an implementation of a wireless coupling system. In some implementations, an access point may start in an idle state 302. Idle state 302 may be set during startup or boot of the device, or responsive to a command from an administrator, such as a stop, reset, or idle command. Access points may operate in an automatic or manual mode. In manual mode, the device may remain in the idle state 302 until receipt of a start command received via a serial interface or other manual trigger (e.g. an activate button on the access point, etc.). In automatic mode, the access point may startup and move to channel selection state 304 automatically. In either mode, an identifier may be provided to control coupling, or a default identifier may be used.

During a first channel selection phase 304, the access point (referred to as the first access point or subject access point) performs scanning on all available channels to determine a channel to use during a discovery phase 306. If no other access point with a matching identifier is detected on any channel during scanning, the first access point will select a least used or quietest channel for use during discovery, as discussed above. If one or more other access points broadcasting a matching identifier are detected during channel scanning, then the first access point will select a channel having a strongest received signal strength from said other access points for use during discovery phase 306. As discussed below, an access point may include in its broadcasts an identifier of a current phase of the access point, such as a data string or header field set to a predetermined value to indicate a current phase (e.g. scanning phase, discovery phase, connection establishment phase, connected phase). In many implementations, the first access point may select the channel having the strongest received signal strength from other access points broadcasting matching identifiers that identify that they are in the discovery phase 306. This may allow the access point to select a channel with available access points that are not presently connected or establishing connections.

Upon determining a channel, the first access point enters the second discovery phase 306. The first access point broadcasts its beacon on the selected channel. In some implementations, the access point also broadcasts an indication that it is in the discovery phase 306. The first access point also measures received signal strength from other access points that are broadcasting beacons on the selected channel, or, in some implementations, access points that are broadcasting indicators that they are in the discovery phase 306. The inclusion of the phase indicator prevents access points from attempting to select as candidates access points that are in channel selection phase 304, or connection establishment phase 308 or connected phase 310 with another access point.

Once a received signal strength is measured from one or more other access points, the first access point also includes in its broadcasts an address or identifier (e.g. MAC address) of the other access point that has the strongest received signal strength (sometimes referred to as the "best" candidate access point), and a credit value for the best candidate access point. As discussed above, the credit starts at zero when the best candidate access point is identified, and is incremented by one if the best candidate access point includes the address of the first access point in its broadcasts (indicating that the best candidate access point has identified the first access point as its own best candidate access point). Upon the credit reaching a predetermined threshold, and upon the best candidate access point indicating that the credit for the first access point has reached the predetermined threshold, the first access point moves into the connection establishment phase 308.

Conversely, if another access point is identified by the first access point as having a higher received signal strength (and thus becomes the new best candidate access point), the credit is reset to zero. Similarly, if the best candidate access point indicates that the subject access point is not its best candidate, the credit is reset to zero. Finally, if no best candidate is identified or the credit for the best candidate access point does not reach the predetermined threshold prior to expiration of a discovery timeout, the first access point returns to the first channel selection phase 304.

In the third connection establishment phase 308, in some implementations, the first access point may include an indication in its beacon advertisement that it is in the connection establishment phase (the best candidate access point may include a similar indication in its advertisements in this phase). In some implementations, the first access point compares its address to the address of the best candidate access point. In some such implementations, if the first access point's address is smaller, then it may be identified as the master for the P2P communication and will perform authentication. If the first access point's address is larger, then it is identified as the slave for the P2P communication and performs handshake initiation.

The slave access point initiates the P2P communication by transmitting a HELLO request message to the master access point, to start key exchange and handshaking. If handshaking is completed successfully, then the access points move into the fourth connected phase 310. If handshaking is not completed prior to expiration of a connection establishment timeout, then each access point resets its P2P configuration and returns to the first channel selection phase 304.

In the fourth connected phase 310, in some implementations, the first access point may include an indication in its beacon advertisement that it is in the connected phase (as does its connected peer access point). Each access point also monitors one or more health characteristics of the connection, including signal to noise ratio, received signal strengths, packet loss ratios, retransmission rates, latency, block error rates, etc. If a characteristic falls below a threshold, such as if no packets are received from the access point's connected peer with a received signal strength greater than the predetermined threshold prior to expiration of a link loss timeout, then the connection is considered lost, and the access point resets its P2P configuration and returns to the first channel selection phase 304.

Figure 4A:
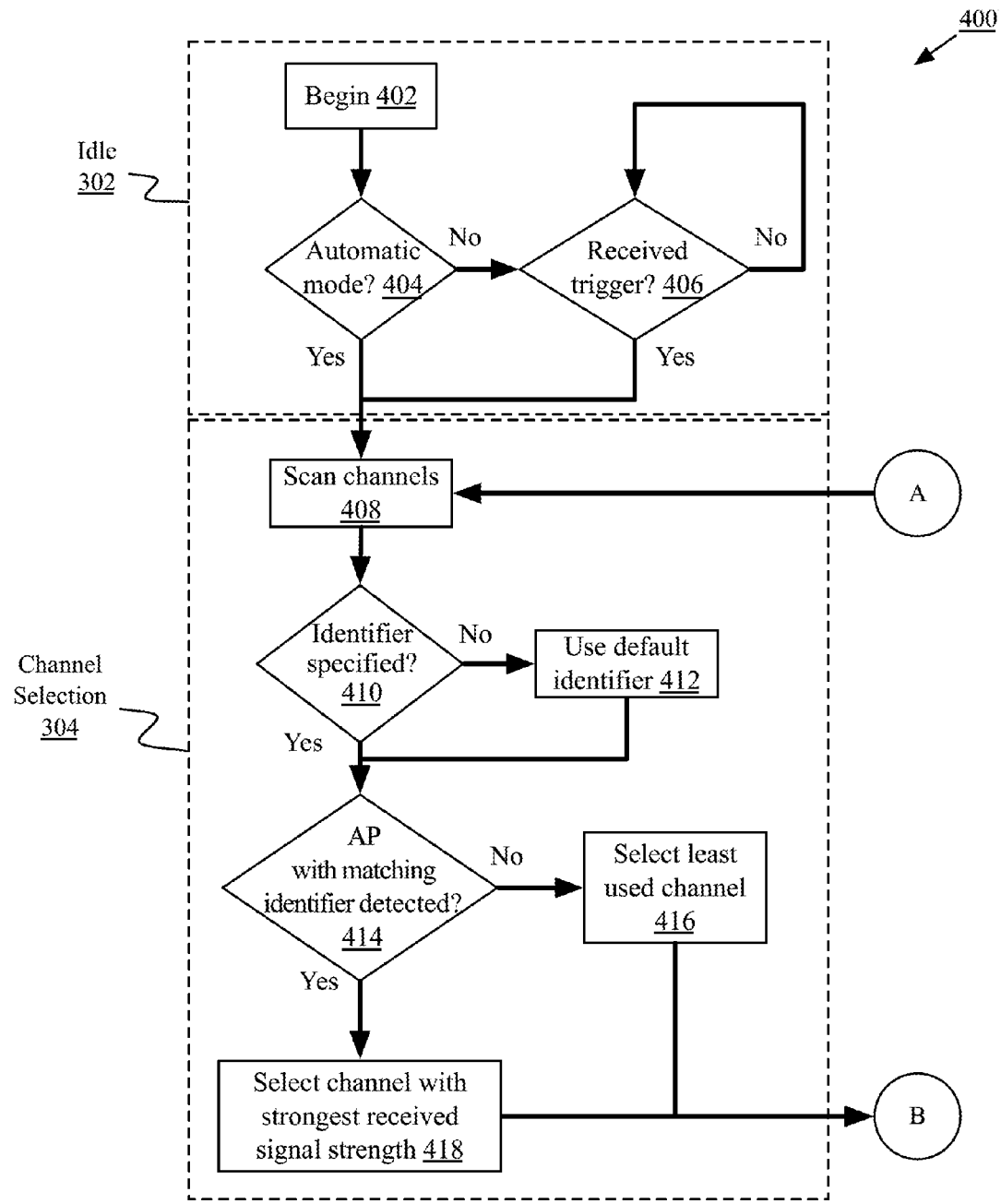
FIGS. 4A-4C are flow charts of a method of wirelessly coupling access points, according to one implementation.
Figure 4B:
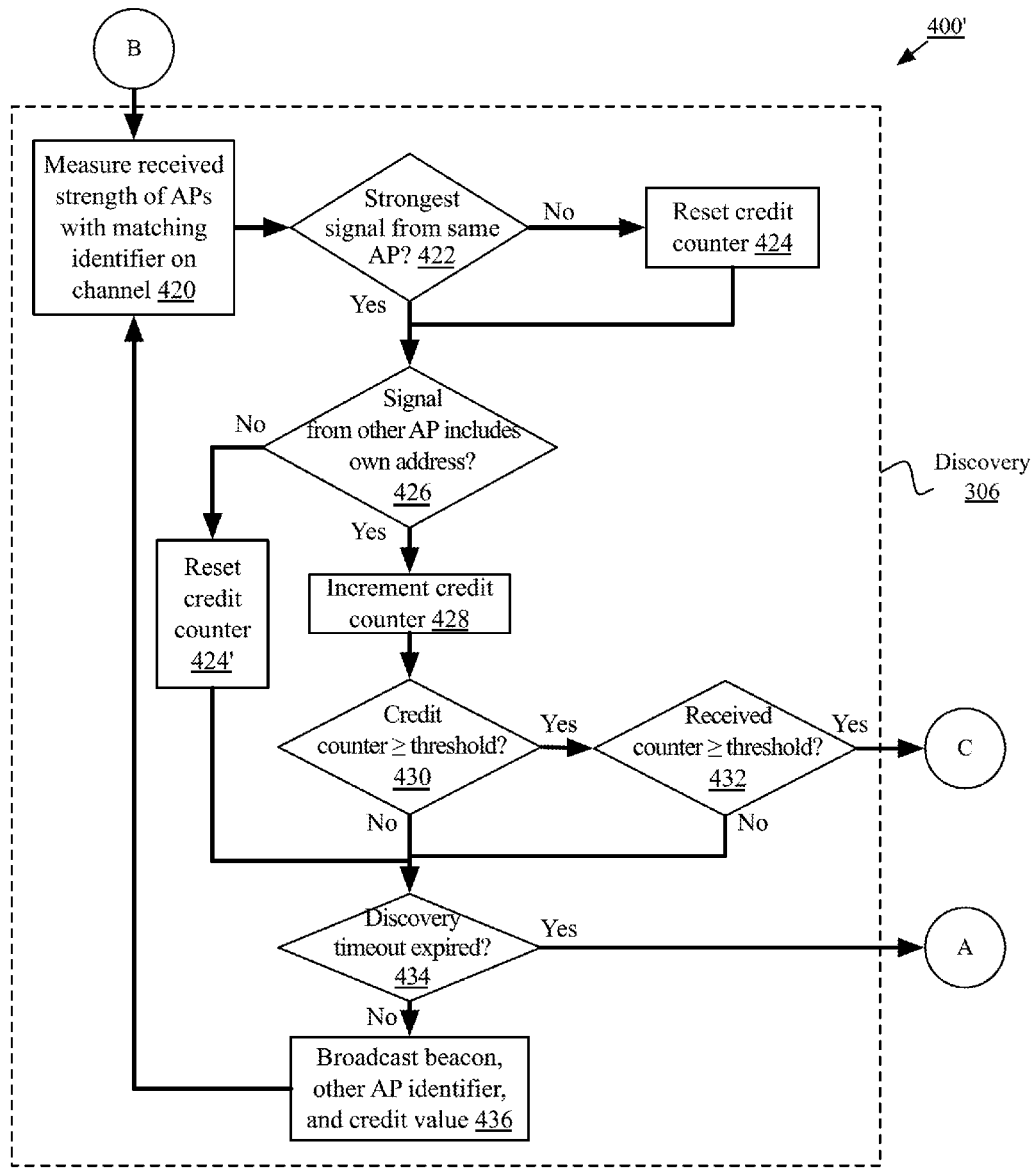
Figure 4C:
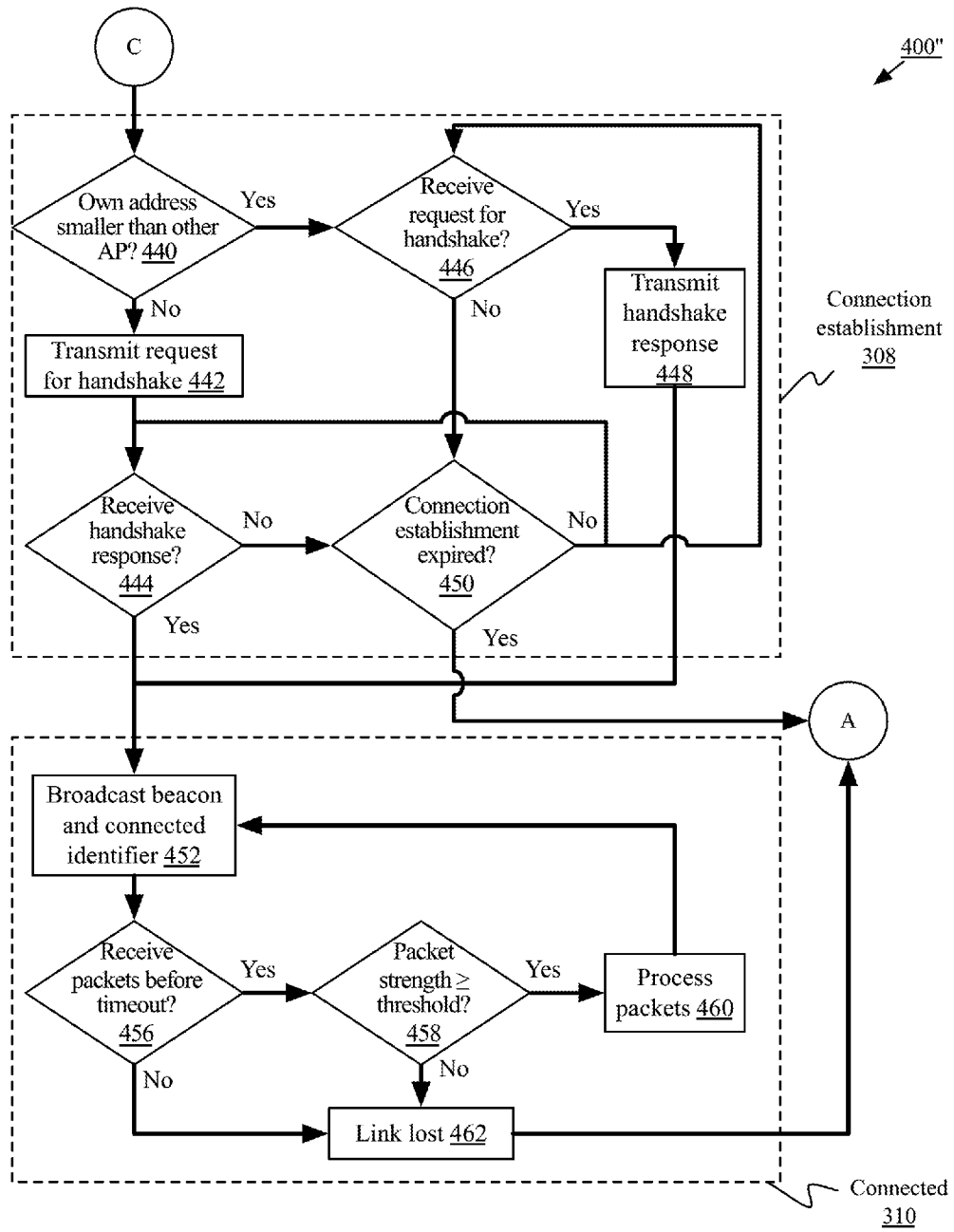

FIGS. 4A-4C are flow charts of a method 400 (shown as method 400' and 400" on FIGS. 4B and 4C, respectively) of wirelessly coupling access points, according to one implementation. States corresponding to the state diagram of FIG. 3 are illustrated in dashed line.

Referring first to FIG. 4A, an access point, referred to as the first or subject access point, may be started up, booted, powered, or otherwise activated at step 402. At step 404, a determination may be made as to whether the first access point is in automatic mode or manual mode. The determination may be based on a value of an internal register, a command received from an administrative device, a physical switch on the device, or any other such indicator. If the first access point is not in automatic mode, then at step 406, the first access point may determine whether it has received a trigger or start command. If not, the first access point may continue waiting at step 406 until receiving a trigger to start command.

Upon receiving a start command or if the first access point is in automatic mode, at step 408, the first access point may begin scanning a plurality of channels. Scanning channels may comprise tuning a receiver to a channel and measuring signals, noise, and/or receiving one or more broadcast packets or signals on the channel. In some implementations, the first access point may scan a plurality of channels simultaneously via a plurality of antennas or receivers. In other implementations, the first access point may scan through a plurality of channels in sequence, monitoring each channel for a period of time iteratively.

As discussed above, in some implementations, an identifier may be specified to manage network topology. In such implementations, the first access point may determine at step 410 whether an identifier has been specified. If not, then at step 412, the first access point may use a default identifier.

Once the channels are scanned, at step 414, the first access point may determine whether it has detected beacon broadcasts from other access points on one or more channels that include a matching identifier (e.g. either the specified or default identifier). If not, then the first access point may be out of range of other access points or may be the first device to begin scanning and broadcasting. Accordingly, at step 416, the first access point may select a least used channel of the plurality of channels to use for candidate discovery and connection establishment. The least used channel may comprise a channel with a lowest noise level, lowest signal level, fewest number of packets per second, or any other such characteristic indicating that the channel has sufficient bandwidth for the first access point to establish a network connection.

If the first access point detects one or more beacon broadcasts from other access points including the matching identifier, then at step 418, the first access point may compare the received signal strength of each beacon broadcast and select a channel of the plurality of channels on which the strongest received beacon was broadcast. In some implementations, at step 418, the first access point may exclude from the comparison one or more beacon broadcasts from other access points that include identifiers indicating that said other access points are in a phase other than the discovery phase (e.g. connected phase, connection establishment phase, etc.), or may only compare received signal strengths of beacon broadcasts that include identifiers indicating that the other access point is in the discovery phase.

Turning to FIG. 4B and continuing with method 400', at step 420, the first access point may tune a receiver to the selected channel and listen to or monitor the channel for beacons broadcast by other access points. The first access point may measure the received signal strength of each received beacon on the channel, and determine a strongest or highest signal strength. The first access point may select the other access point whose beacon has the strongest received signal strength as a candidate access point. In some implementations, the first access point may only monitor or measure signal strengths of access points that include an indicator in their broadcast beacon indicating that they are in the discovery phase 306, as discussed above. This prevents the first access point from attempting to discover or establish a connection with another access point that is connecting or connected to a third access point.

At step 422, the first access point may determine if the selected candidate access point was selected as the candidate access point in a previous iteration, or determine if the strongest received signal is still from the same other access point. If not, the first access point may reset a credit counter at step 424. In some implementations, steps 422 and 424 may be skipped during a first iteration, as no previous candidate beacon may have been selected.

At step 426, the first access point may determine if the beacon broadcast by the selected candidate access point includes the address of the first access point. As discussed above, in some implementations, beacons may include the identifier or address of the broadcasting access point; an identifier or address of a candidate access point selected by the broadcasting access point; and a credit or counter value for the candidate access point maintained by the broadcasting access point. If the received beacon includes the address of the first access point, then the broadcasting access point has identified the first access point as its own best candidate access point.

If the beacon broadcast by the selected candidate access point does not include the address of the first access point, then at step 424', a credit counter for the candidate access point may be reset. For example, if the selected candidate access point identifies a third candidate access point as its best candidate, then the first access point should not attempt to establish a connection with the selected candidate access point, but should seek another access point.

If the beacon broadcast by the selected candidate access point does include the address of the first access point, then at step 428, the first access point may increment the credit counter maintained by the first access point for the selected candidate access point. The credit counter thus indicates the number of discovery iterations during which each access point has identified the other as its best candidate.

At step 430, the first access point may compare the credit counter it maintains for the candidate access point to a threshold. As discussed above, the threshold may be any value or number of discovery iterations, such as 10, 20, 30, 50, or any other such value. If the credit counter maintained for the candidate access point exceeds the threshold, then at step 432, the first access point may compare the credit counter value received in the broadcast beacon from the candidate access point (indicating the credit value maintained by the candidate access point for the first access point) to the threshold. If the received counter value exceeds the threshold, then the first access point may move into the connection establishment phase 308. In some implementations, steps 430-432 may be performed in reverse order.

If the counter value is reset at step 424', or either credit counter value is not above the threshold, then at step 434, the first access point may determine whether a discovery timeout period has expired. The discovery timeout may be any length of time, such as 30 seconds, 60 seconds, 120 seconds, or any other such value. If no candidate is identified or counter values are not incremented to the threshold, then the first access point may return to the channel selection phase and repeat steps 408-418.

If the timeout period has not expired, then at step 436, the first access point may broadcast its own beacon on the channel. As discussed above, the beacon may include an address or identifier of the first access point, an address or identifier of the selected candidate access point, a counter value for the selected candidate access point, and, in some implementations, an indicator that the first access point is in the discovery phase. The beacon may be broadcast in any format consistent with the wireless communication protocol (such as an SSID broadcast). Steps 420-436 may then be iteratively repeated until counter values for a selected candidate are incremented to the threshold or the discovery timeout expires.

Turning to FIG. 4C, upon the first access point's counter value and the candidate access point's counter value reaching the threshold, the access points may begin connection establishment. The first access point may determine, at step 440, whether its own address or identifier (such as a MAC address, configured name, or other such identifier) is smaller than the corresponding address or identifier of the candidate access point. If the first access point's address is not smaller, then the first access point may determine that it is the client or slave for the P2P connection, and may transmit a request for connection establishment or handshaking to the candidate access point at step 442. The request may be transmitted in any form consistent with the wireless or P2P protocol. The first access point may determine if it has received a handshake response from the candidate access point at step 444. If no response has been received, then at step 450, the first access point may determine if a connection establishment timeout has expired. The connection establishment timeout may be any length of time, such as 10 seconds, 30 seconds, 60 seconds, or any other such value. If the timeout has not expired, then steps 444-450 may be repeated until a response is received or the timeout expires. If the timeout does expire, then the first access point may reset its connection parameters, including an identification of the selected channel and/or candidate access point and the counter value, and return to the channel scanning phase.

If the first access point's address or identifier is smaller than the address or identifier of the candidate access point, then the first access point may determine that it is the host or master for the connection. At step 446, the first access point may wait to receive a request for handshaking or connection establishment from the candidate access point. If no request is received, then at step 450, the first access point may determine if a connection establishment timeout has expired. If the timeout has not expired, then steps 446-450 may be repeated until a response is received or the timeout expires.

If the first access point receives a connection request at step 446, then at step 448, the first access point may transmit a handshaking or connection response to the candidate access point. The connection response may include connection parameters, including keys, sequence identifiers, window sizes, transmission unit sizes, or any other such information utilized by the wireless protocol.

In some implementations, the first access point may determine that it is the host of the connection if its address is smaller than the address of the candidate access point; accordingly, step 440 may be based off any such comparison, as configured by an administrator or manufacturer of the access point.

In some implementations, the first access point may periodically broadcast its beacon during connection establishment 308, such as at step 450. In such implementations, the broadcast beacon may include an indicator that the first access point is in the connection establishment phase, to prevent other access points in the discovery or channel selection phases from selecting the first access point as a candidate.

Once a connection has been established, at step 452, the first access point may transmit and receive packets to and from the candidate access point, and may periodically broadcast its beacon and an indicator that the first access point is in the connected phase, as discussed above. The first access point may also monitor a health of the connection. In one such implementation, if no packets are received before expiration of a link loss timeout at step 456, then the first access point may determine that the link is lost at step 462. Similarly, if the received signal strength of packets from the candidate access point is less than a strength threshold at step 458, then the first access point may determine that the link is lost at step 462. Other comparisons may be performed for latency, noise, error rate, etc. If the connection is healthy, then at step 460, the access point may process packets and repeat steps 452-460. If the link is determined to be lost at step 462, then the first access point may reset its connection parameters, including an identification of the selected channel and/or candidate access point and the counter value, and return to the channel scanning phase.

Accordingly, the systems and methods discussed herein provide for automatic channel selection, discovery, and connection establishment via accumulation of credits from mutual identification in broadcast beacons. In one aspect, the present disclosure describes a method for establishing a connection between access points. The method includes receiving, by a first device from a second device, a broadcast packet comprising an identifier of the first device and a first credit value for the first device maintained by the second device. The method also includes determining, by the first device, that the first credit value for the first device maintained by the second device exceeds a predetermined threshold. The method further includes determining, by the first device, that a second credit value for the second device maintained by the first device exceeds the predetermined threshold. The method also includes establishing, by the first device with the second device, a connection, responsive to the determination that the first credit value exceeds the predetermined threshold and the second credit value exceeds the predetermined threshold.

In some implementations, the method includes detecting the identifier of the first device in the received broadcast packet, by the first device; and incrementing the second credit value for the second device, by the first device, responsive to the detection. In other implementations, the method includes transmitting, by the first device, a second broadcast packet comprising an identifier of the second device and the second credit value for the second device maintained by the first device. In a further implementation, the method includes determining, by the first device, that a received signal strength of the first broadcast packet is higher than a received signal strength of each of one or more additional broadcast packets received by the first device from a corresponding one or more additional devices; and generating the second broadcast packet comprising the identifier of the second device, by the first device, responsive to the determination that the received signal strength of the first broadcast packet is higher than the received signal strength of each of the one or more additional broadcast packets received from the corresponding one or more additional devices.

In some implementations, the method includes, prior to receiving the broadcast packet, transmitting, by the first device, a third broadcast packet comprising an identifier of a third device and a third credit value for the third device maintained by the first device; receiving, by the first device from the third device, a fourth broadcast packet comprising an identifier of a device different from the first device; and resetting, by the first device, the third credit value, responsive to receiving the fourth broadcast packet.

In other implementations, the method includes scanning, by the first device, a plurality of broadcast channels; and selecting, by the first device, a first channel of the plurality of broadcast channels to utilize for establishing the connection. In a further implementation, the method includes detecting, by the first device, a packet comprising a predetermined identifier broadcast on the first channel; and detecting, by the first device, a packet comprising the predetermined identifier broadcast on a second channel. The method also includes selecting the first channel, by the first device, responsive to a received signal strength of the packet broadcast on the first channel exceeding a received signal strength of the packet broadcast on the second channel. In another further implementation, the method includes detecting, by the first device, an absence of packets comprising a predetermined identifier broadcast on any of the plurality of channels; and selecting the first channel, by the first device, responsive to a determination that the first channel is a least used channel of the plurality of channels. In a still further implementation, the method includes receiving, by the first device, one or more packets broadcast on one or more of the plurality of channels, the one or more packets not including the predetermined identifier.

In some implementations, the method includes determining, by the first device, that an address of the first device is larger than an address of the second device; and transmitting a request for handshake initiation, by the first device to the second device, responsive to the determination that the address of the first device is larger than the address of the second device.

In another aspect, the present disclosure is directed to a system for establishing a connection between access points.

The system includes a first device comprising a wireless transmitter, a wireless receiver, a candidate selector, and a candidate credit counter. The wireless receiver is configured to receive, from a second device, a broadcast packet comprising an identifier of the first device and a first credit value for the first device maintained by the second device. The candidate selector is configured to determine that the first credit value for the first device maintained by the second device exceeds a predetermined threshold, and determine that a second credit value for the second device maintained by the first device via the candidate credit counter exceeds the predetermined threshold. The wireless transmitter is configured to establish a connection with the second device, responsive to the determination that the first credit value exceeds the predetermined threshold and the second credit value exceeds the predetermined threshold.

In some implementations, the candidate selector is further configured to detect the identifier of the first device in the received broadcast packet, by the first device; and wherein the candidate credit counter is configured to increment the second credit value for the second device, responsive to the detection. In other implementations, the wireless transmitter is further configured to transmit a second broadcast packet comprising an identifier of the second device and the second credit value for the second device maintained by the first device via the candidate credit counter. In a further implementation, the candidate selector is further configured to determine that a received signal strength of the first broadcast packet is higher than a received signal strength of each of one or more additional broadcast packets received via the wireless receiver from a corresponding one or more additional devices; and the wireless transmitter is further configured to transmit the second broadcast packet comprising the identifier of the second device, responsive to the determination that the received signal strength of the first broadcast packet is higher than the received signal strength of each of the one or more additional broadcast packets received from the corresponding one or more additional devices.

In some implementations, the wireless transmitter is further configured to transmit a third broadcast packet comprising an identifier of a third device and a third credit value for the third device maintained by the first device via the candidate credit counter. The wireless receiver is further configured to receive, from the third device, a fourth broadcast packet comprising an identifier of a device different from the first device. The candidate selector is further configured to reset the third credit value maintained via the candidate credit counter, responsive to receiving the fourth broadcast packet.

In some implementations, the system includes a channel analyzer configured to scan a plurality of broadcast channels; and select a first channel of the plurality of broadcast channels to utilize for establishing the connection. In a further implementation, the channel analyzer is further configured to detect a packet comprising a predetermined identifier broadcast on the first channel; detect a packet comprising the predetermined identifier broadcast on a second channel; and select the first channel, responsive to a received signal strength of the packet broadcast on the first channel exceeding a received signal strength of the packet broadcast on the second channel. In another further implementation, the channel analyzer is further configured to detect an absence of packets comprising a predetermined identifier broadcast on any of the plurality of channels; and select the first channel, responsive to a determination that the first channel is a least used channel of the plurality of channels. In a still further implementation, the wireless receiver is further configured to receive one or more packets broadcast on one or more of the plurality of channels, the one or more packets not including the predetermined identifier. In another implementation, the wireless transmitter is further configured to transmit a request for handshake initiation, by the first device to the second device, responsive to a determination that an address of the first device is larger than an address of the second device.

B. Computing and Network Environment

Figure 5A:
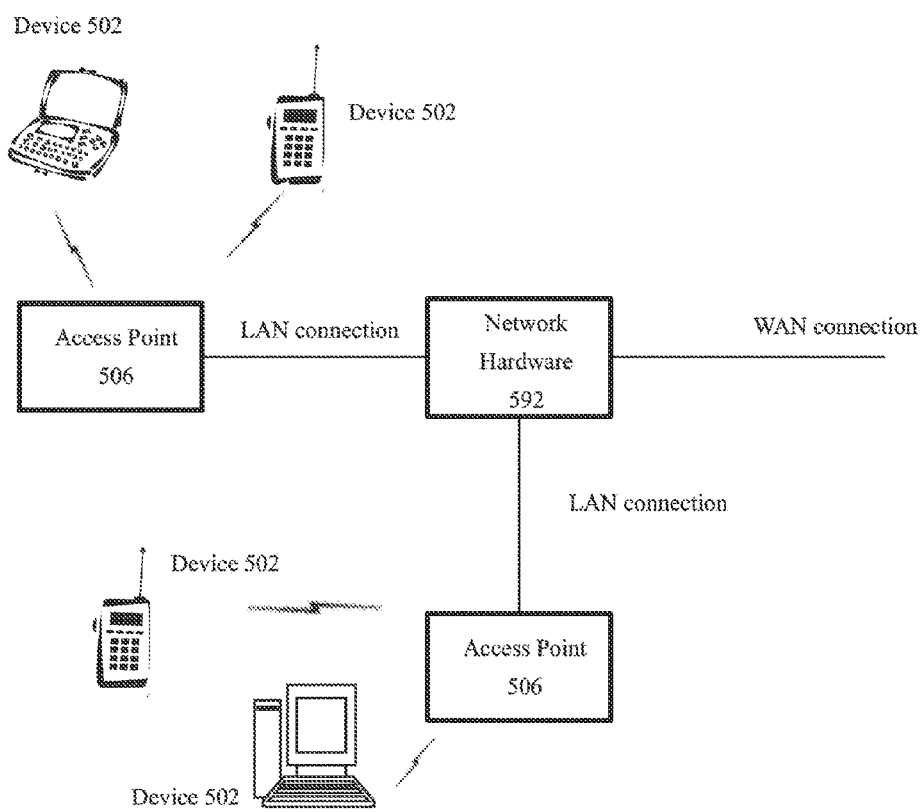
FIG. 5A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 5A, an embodiment of a network environment is depicted. In brief overview, the network environment includes a wireless communication system that includes one or more access points 506, one or more wireless communication devices 502 and a network hardware component 592. The wireless communication devices 502 may for example include laptop computers 502, tablets 502, personal computers 502 and/or cellular telephone devices 502. The details of an embodiment of each wireless communication device and/or access point are described in greater detail with reference to FIGS. 5B and 5C. The network environment can be an ad hoc network environment, an infrastructure wireless network environment, a subnet environment, etc. in one embodiment.

The access points (APs) 506 may be operably coupled to the network hardware 592 via local area network connections. The network hardware 592, which may include a router, gateway, switch, bridge, modem, system controller, appliance, etc., may provide a local area network connection for the communication system. Each of the access points 506 may have an associated antenna or an antenna array to communicate with the wireless communication devices 502 in its area. The wireless communication devices 502 may register with a particular access point 506 to receive services from the communication system (e.g., via a SU-MIMO or MU-MIMO configuration). For direct connections (e.g., point-to-point communications), some wireless communication devices 502 may communicate directly via an allocated channel and communications protocol. Some of the wireless communication devices 502 may be mobile or relatively static with respect to the access point 506.

In some embodiments an access point 506 includes a device or module (including a combination of hardware and software) that allows wireless communication devices 502 to connect to a wired network using Wi-Fi, or other standards. An access point 506 may sometimes be referred to as an wireless access point (WAP). An access point 506 may be configured, designed and/or built for operating in a wireless local area network (WLAN). An access point 506 may connect to a router (e.g., via a wired network) as a standalone device in some embodiments. In other embodiments, an access point can be a component of a router. An access point 506 can provide multiple devices 502 access to a network. An access point 506 may, for example, connect to a wired Ethernet connection and provide wireless connections using radio frequency links for other devices 502 to utilize that wired connection. An access point 506 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 506 may be used for (e.g., in-home or in-building) wireless networks (e.g., IEEE 802.11, Bluetooth, ZigBee, any other type of radio frequency based network protocol and/or variations thereof). Each of the wireless communication devices 502 may include a built-in radio and/or is coupled to a radio. Such wireless communication devices 502 and/or access points 506 may operate in accordance with the various aspects of the disclosure as presented herein to enhance performance, reduce costs and/or size, and/or enhance broadband applications. Each wireless communication devices 502 may have the capacity to function as a client node seeking access to resources (e.g., data, and connection to networked nodes such as servers) via one or more access points 506.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 5B:
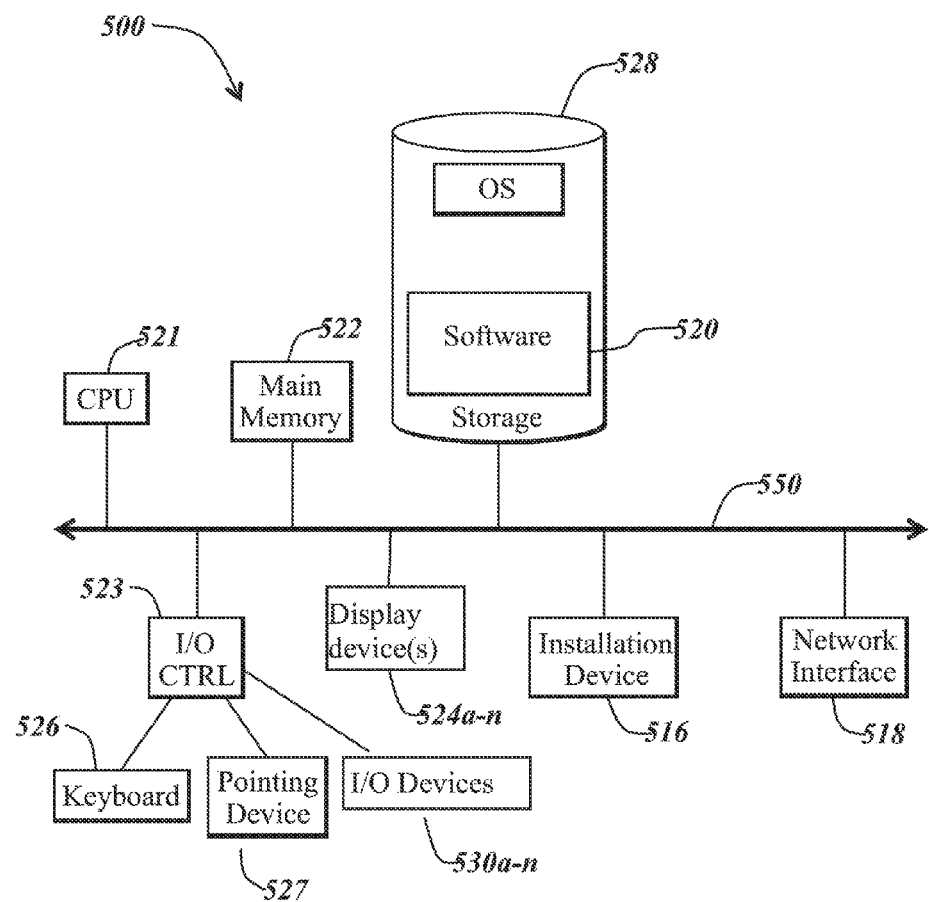
FIGS. 5B and 5C are block diagrams depicting embodiments of computing devices useful in connection with the methods and systems described herein.
Figure 5C:
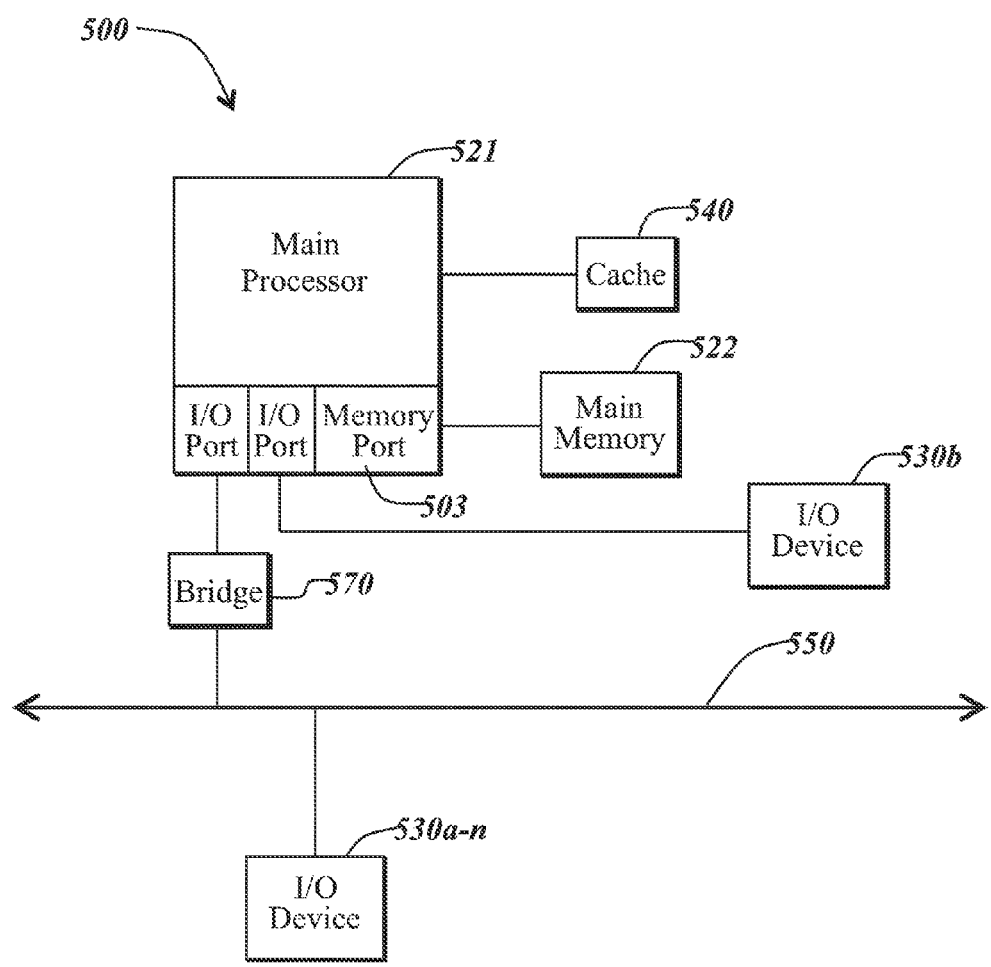

The communications device(s) 502 and access point(s) 506 may be deployed as and/or executed on any type and form of computing device, such as a computer, network device or appliance capable of communicating on any type and form of network and performing the operations described herein. FIGS. 5B and 5C depict block diagrams of a computing device 500 useful for practicing an embodiment of the wireless communication devices 502 or the access point 506. As shown in FIGS. 5B and 5C, each computing device 500 includes a central processing unit 521, and a main memory unit 522. As shown in FIG. 5B, a computing device 500 may include a storage device 528, an installation device 516, a network interface 518, an I/O controller 523, display devices 524a-524n, a keyboard 526 and a pointing device 527, such as a mouse. The storage device 528 may include, without limitation, an operating system and/or software. As shown in FIG. 5C, each computing device 500 may also include additional optional elements, such as a memory port 503, a bridge 570, one or more input/output devices 530a-530n (generally referred to using reference numeral 530), and a cache memory 540 in communication with the central processing unit 521.

The central processing unit 521 is any logic circuitry that responds to and processes instructions fetched from the main memory unit 522. In many embodiments, the central processing unit 521 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 500 may be based on any of these processors, or any other processor capable of operating as described herein.

Main memory unit 522 may be one or more memory chips capable of storing data and allowing any storage location to be directly accessed by the microprocessor 521, such as any type or variant of Static random access memory (SRAM), Dynamic random access memory (DRAM), Ferroelectric RAM (FRAM), NAND Flash, NOR Flash and Solid State Drives (SSD). The main memory 522 may be based on any of the above described memory chips, or any other available memory chips capable of operating as described herein. In the embodiment shown in FIG. 5B, the processor 521 communicates with main memory 522 via a system bus 550 (described in more detail below). FIG. 5C depicts an embodiment of a computing device 500 in which the processor communicates directly with main memory 522 via a memory port 503. For example, in FIG. 5C the main memory 522 may be DRDRAM.

FIG. 5C depicts an embodiment in which the main processor 521 communicates directly with cache memory 540 via a secondary bus, sometimes referred to as a backside bus. In other embodiments, the main processor 521 communicates with cache memory 540 using the system bus 550. Cache memory 540 typically has a faster response time than main memory 522 and is provided by, for example, SRAM, BSRAM, or EDRAM. In the embodiment shown in FIG. 5C, the processor 521 communicates with various I/O devices 530 via a local system bus 550. Various buses may be used to connect the central processing unit 521 to any of the I/O devices 530, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 524, the processor 521 may use an Advanced Graphics Port (AGP) to communicate with the display 524. FIG. 5C depicts an embodiment of a computer 500 in which the main processor 521 may communicate directly with I/O device 530b, for example via HYPERTRANSPORT, RAPIDIO, or INFINIBAND communications technology. FIG. 5C also depicts an embodiment in which local busses and direct communication are mixed: the processor 521 communicates with I/O device 530a using a local interconnect bus while communicating with I/O device 530b directly.

A wide variety of I/O devices 530a-530n may be present in the computing device 500. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 523 as shown in FIG. 5B. The I/O controller may control one or more I/O devices such as a keyboard 526 and a pointing device 527, e.g., a mouse or optical pen. Furthermore, an I/O device may also provide storage and/or an installation medium 516 for the computing device 500. In still other embodiments, the computing device 500 may provide USB connections (not shown) to receive handheld USB storage devices such as the USB Flash Drive line of devices manufactured by Twintech Industry, Inc. of Los Alamitos, Calif.

Referring again to FIG. 5B, the computing device 500 may support any suitable installation device 516, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 500 may further include a storage device, such as one or more hard disk drives or redundant arrays of independent disks, for storing an operating system and other related software, and for storing application software programs such as any program or software 520 for implementing (e.g., configured and/or designed for) the systems and methods described herein. Optionally, any of the installation devices 516 could also be used as the storage device. Additionally, the operating system and the software can be run from a bootable medium.

Furthermore, the computing device 500 may include a network interface 518 to interface to the network 504 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 500 communicates with other computing devices 500' via any type and/or form of gateway or tunneling protocol such as Secure Socket Layer (SSL) or Transport Layer Security (TLS). The network interface 518 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

In some embodiments, the computing device 500 may include or be connected to one or more display devices 524a-524n. As such, any of the I/O devices 530a-530n and/or the I/O controller 523 may include any type and/or form of suitable hardware, software, or combination of hardware and software to support, enable or provide for the connection and use of the display device(s) 524a-524n by the computing device 500. For example, the computing device 500 may include any type and/or form of video adapter, video card, driver, and/or library to interface, communicate, connect or otherwise use the display device(s) 524a-524n. In one embodiment, a video adapter may include multiple connectors to interface to the display device(s) 524a-524n. In other embodiments, the computing device 500 may include multiple video adapters, with each video adapter connected to the display device(s) 524a-524n. In some embodiments, any portion of the operating system of the computing device 500 may be configured for using multiple displays 524a-524n. One ordinarily skilled in the art will recognize and appreciate the various ways and embodiments that a computing device 500 may be configured to have one or more display devices 524a-524n.

In further embodiments, an I/O device 530 may be a bridge between the system bus 550 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 500 of the sort depicted in FIGS. 5B and 5C may operate under the control of an operating system, which control scheduling of tasks and access to system resources. The computing device 500 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 500 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 500 has sufficient processor power and memory capacity to perform the operations described herein.

In some embodiments, the computing device 500 may have different processors, operating systems, and input devices consistent with the device. For example, in one embodiment, the computing device 500 is a smart phone, mobile device, tablet or personal digital assistant. In still other embodiments, the computing device 500 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 500 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for wireless channel selection, comprising:
   scanning, by a first device, a plurality of broadcast channels for a broadcast by a second device;
   determining, by the first device, whether a broadcast by the second device comprising a predetermined topology configuration identifier has been detected;
   selecting, by the first device, a first channel of the plurality of broadcast channels for use by a discovery protocol, responsive to the determination;
   broadcasting via the first channel, by the first device, a device identifier of the first device;
   receiving, by the first device from the second device on the selected first channel, a broadcast packet comprising the device identifier of the first device and a first credit value for the first device maintained by the second device; and
   establishing, by the first device with the second device, a connection, responsive to a determination that the first credit value for the first device maintained by the second device exceeds the predetermined threshold and that a second credit value for the second device maintained by the first device exceeds the predetermined threshold.

2. The method of claim 1, wherein selecting the first channel comprises selecting a channel of the plurality of broadcast channels having a strongest received signal strength, responsive to determining that a broadcast by the second device comprising the predetermined topology configuration identifier has been detected.

3. The method of claim 2, wherein selecting the first channel further comprises:
   detecting, by the first device, a plurality of packets comprising the predetermined topology configuration identifier broadcast on each of a plurality of channels, each packet having a different received signal strength; and
   selecting the first channel of the plurality of broadcast channels, responsive to the packet detected on the first channel having the strongest received signal strength.

4. The method of claim 1, wherein selecting the first channel comprises selecting a least used channel of the plurality of broadcast channels, responsive to determining that a broadcast by the second device comprising the predetermined topology configuration identifier has not been detected.

5. The method of claim 4, further comprising receiving, by the first device, one or more packets broadcast on one or more of the plurality of channels, the one or more packets not including the predetermined topology configuration identifier.

6. The method of claim 1, further comprising:
   detecting the device identifier of the first device in the received broadcast packet, by the first device; and
   incrementing the second credit value for the second device, by the first device, responsive to the detection.

7. The method of claim 1, further comprising:
   transmitting, by the first device, a second broadcast packet comprising a device identifier of the second device and the second credit value for the second device maintained by the first device.

8. The method of claim 7, wherein transmitting the second broadcast packet further comprises:
   determining, by the first device, that a received signal strength of the first broadcast packet is higher than a received signal strength of each of one or more additional broadcast packets received by the first device on the selected channel from a corresponding one or more additional devices; and
   generating the second broadcast packet comprising the device identifier of the second device, by the first device, responsive to the determination that the received signal strength of the first broadcast packet is higher than the received signal strength of each of the one or more additional broadcast packets received from the corresponding one or more additional devices.

9. The method of claim 1, wherein establishing the connection further comprises:
   determining, by the first device, that an address of the first device is larger than an address of the second device; and
   transmitting a request for handshake initiation, by the first device to the second device, responsive to the determination that the address of the first device is larger than the address of the second device.

10. A system for wireless channel selection, comprising:
    a first device comprising a wireless transmitter, a wireless receiver, and a candidate selector;
    wherein the wireless receiver is configured to scan a plurality of broadcast channels for a broadcast by a second device;
    wherein the candidate selector is configured to:
       determine whether a broadcast by the second device comprising a predetermined topology configuration identifier has been detected, and
       select a first channel of the plurality of broadcast channels for use by a discovery protocol, responsive to the determination;
    wherein the wireless transmitter is configured to broadcast, via the first channel, a device identifier of the first device;
    wherein the wireless receiver is further configured to receive, from the second device on the selected first channel, a broadcast packet comprising the device identifier of the first device and a first credit value for the first device maintained by the second device; and
    wherein the first device is configured to establish, with the second device, a connection, responsive to a determination that the first credit value for the first device maintained by the second device exceeds the predetermined threshold and that a second credit value for the second device maintained by the first device exceeds the predetermined threshold.

11. The system of claim 10, wherein the candidate selector is further configured to select a channel of the plurality of broadcast channels having a strongest received signal strength, responsive to determining that a broadcast by the second device comprising the predetermined topology configuration identifier has been detected.

12. The system of claim 11, wherein the wireless receiver is further configured to detect a plurality of packets comprising the predetermined topology configuration identifier broadcast on each of a plurality of channels, each packet having a different received signal strength; and
wherein the candidate selector is further configured to select the first channel of the plurality of broadcast channels, responsive to the packet detected on the first channel having the strongest received signal strength.

13. The system of claim 10, wherein the candidate selector is further configured to select a least used channel of the plurality of broadcast channels, responsive to determining that a broadcast by the second device comprising the predetermined topology configuration identifier has not been detected.

14. The system of claim 13, wherein the wireless receiver is further configured to receive one or more packets broadcast on one or more of the plurality of channels, the one or more packets not including the predetermined topology configuration identifier.

15. The system of claim 10, wherein the first device is further configured to:
detect the device identifier of the first device in the received broadcast packet; and
increment the second credit value for the second device, responsive to the detection.

16. The system of claim 10, wherein the wireless transmitter is configured to transmit a second broadcast packet comprising a device identifier of the second device and the second credit value for the second device maintained by the first device.

17. The system of claim 16, wherein the candidate selector is further configured to determine that a received signal strength of the first broadcast packet is higher than a received signal strength of each of one or more additional broadcast packets received by the first device on the selected channel from a corresponding one or more additional devices; and
wherein the first device is configured to generate the second broadcast packet comprising the device identifier of the second device, responsive to the determination that the received signal strength of the first broadcast packet is higher than the received signal strength of each of the one or more additional broadcast packets received from the corresponding one or more additional devices.

18. The system of claim 10, wherein the first device is further configured to determine that an address of the first device is larger than an address of the second device; and
wherein the wireless transmitter is configured to transmit a request for handshake initiation, to the second device, responsive to the determination that the address of the first device is larger than the address of the second device.

* * * * *